United States Patent [19]

Bjarsch

[11] 4,188,865

[45] Feb. 19, 1980

[54] ELECTRIC TOASTER

[75] Inventor: Otto Bjarsch, Traunreut, Fed. Rep. of Germany

[73] Assignee: Bosch-Siemens Hausgerate GmbH, Stuttgart, Fed. Rep. of Germany

[21] Appl. No.: 800,440

[22] Filed: May 25, 1977

[30] Foreign Application Priority Data

| Jun. 1, 1976 [DE] | Fed. Rep. of Germany | 2624541 |
| Jun. 1, 1976 [DE] | Fed. Rep. of Germany | 2624563 |
| Jun. 1, 1976 [DE] | Fed. Rep. of Germany | 2624578 |
| Jun. 1, 1976 [DE] | Fed. Rep. of Germany | 7617475[U] |

[51] Int. Cl.² ............................................. A47J 37/08
[52] U.S. Cl. ........................................ 99/327; 99/338
[58] Field of Search ................ 99/326, 327, 331, 332, 99/334, 335, 329 R, 337, 338

[56] References Cited

U.S. PATENT DOCUMENTS

| 2,251,925 | 8/1941 | Edmunds | 99/327 |
| 2,621,583 | 12/1952 | Victor | 99/327 |
| 2,638,164 | 5/1953 | Victor | 99/327 X |
| 2,913,976 | 11/1959 | Cole | 99/327 |
| 3,086,623 | 4/1963 | Cole | 99/327 X |
| 3,392,663 | 7/1968 | Williams | 99/329 R |
| 3,438,318 | 4/1969 | Williams | 99/329 R |
| 3,869,970 | 3/1975 | Eagle | 99/329 R |

FOREIGN PATENT DOCUMENTS

| 600875 | 4/1948 | United Kingdom | 99/335 |
| 649005 | 1/1951 | United Kingdom | 99/327 |

Primary Examiner—Billy J. Wilhite
Attorney, Agent, or Firm—Herbert L. Lerner

[57] ABSTRACT

An electric toaster having a housing, a bread carrier therein, heating elements in the housing, a pneumatic timer switch having a cylinder and piston movable relative to one another with a spring urging upward movement, a throttle opening for escape of air from cylinder during upward movement, a wind-up element for lowering the bread carrier and cocking the pneumatic timer switch, and guide means for guiding the movement of the bread carrier, wind-up element and cylinder and piston. The toaster is simple in design and with a small number of easy-to-assemble parts. The heating elements are switched off at the end of the selected toasting time even if the toast jams in the toaster.

28 Claims, 8 Drawing Figures

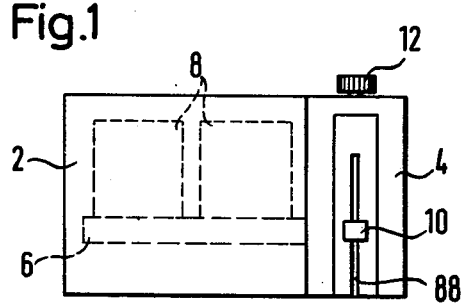
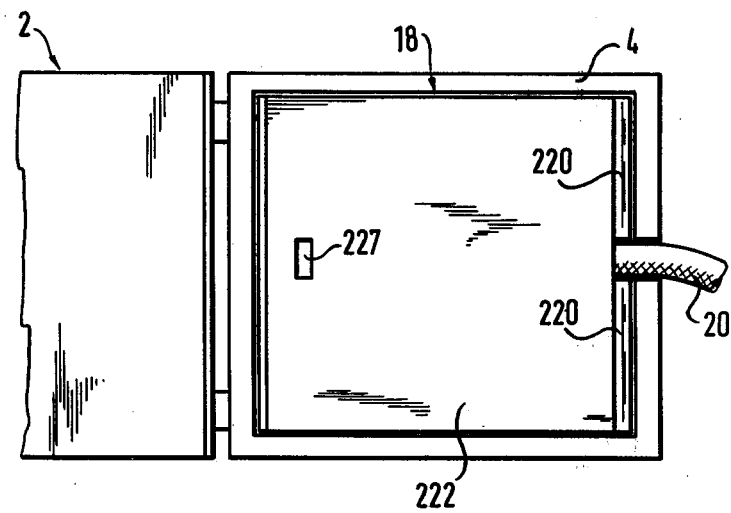

Fig. 2

ELECTRIC TOASTER

BACKGROUND OF THE INVENTION

1. Field of the Invention

This invention relates to a toaster and more particularly refers to a new and improved electric toaster which is easier to manufacture and which switches-off the heating elements at the end of the toasting period independently of the upward movement of the bread carrier.

2. Description of the Prior Art

Electric bread toasters having a housing, a bread carrier movable therein and a wind-up element for lowering the bread carrier and cocking a timer are known.

Although bread toasters of this type are distinguished by their relatively simple design, the number of individual parts is nevertheless large, which naturally makes the procurement or manufacture and the stocking of parts expensive and also necessitates a large number of assembly steps.

In known bread toasters, there is further the danger that, if at the end of the toasting time a timer releases the bread carrier which is locked in the toasting position, in order to move the toast into its take-up position and to switch off at the same time the heater, the bread carrier stops in the lowered position if the toast jams, and the heater remains switched on and the toast is charred or even begins to burn.

SUMMARY OF THE INVENTION

An object of the present invention is to provide a bread toaster of simple design, in which, with optimal operating convenience, a small number of easy-to-assemble parts is sufficient.

A further object of the invention is to provide a bread toaster in which a conveniently operable release device for the bread carrier is designed in a structurally very simple manner.

A still further object of the invention is to provide an easy-to-manufacture bread toaster, in which the heater is switched off at the end of the toasting time even if the toast jams.

With the foregoing and other objects in view, there is provided in accordance with the invention an electric toaster having a housing, a toasting chamber in the housing, an opening in the top of the housing for insertion of bread in the toasting chamber, a bread carrier movable down and up in the toasting chamber, heating elements in the toasting chamber for toasting the bread when the bread is moved down on the bread carrier in the toasting chamber, the combination therewith of a control chamber adjacent the toasting chamber, a pneumatic timer switch in the control chamber having a cylinder and piston movable relative to one another and a spring urging upward movement of the cylinder and piston relative to one another, and a throttle opening through which fluid escapes from the cylinder during the upward movement to retard the upward spring urging, a wind-up element for lowering the bread carrier and cocking the pneumatic timer switch extending through the control chamber engaging the bread carrier and the movable portion of the cylinder and piston, and guide means for guiding the movement of the bread carrier and the movement of the wind-up element and the relative movement of the cylinder and piston.

In accordance with the invention there is provided an electric toaster comprising a housing, an opening in the top of the housing for insertion of bread, a bread carrier movable down and up in the housing, a spring urging the bread carrier upwardly, lock means for holding the bread carrier in down position against the urging of the spring, heating elements for toasting the bread when the bread is moved down on the bread carrier in locked position, a pneumatic timer switch having a cylinder and piston movable relative to one another and a spring urging upward movement of the cylinder and piston relative to one another, and a throttle opening through which fluid escapes from the cylinder during the upward movement, a wind-up element for lowering the bread carrier and cocking the pneumatic timer switch engaging the bread carrier and the movable portion of the cylinder and piston, the lock means for holding the bread carrier in down position disposed in the locked position in the path of motion of the wind-up element and is unlocked by moving the wind-up element against the wind-up direction.

In a further embodiment there is provided an electric toaster having a housing, a bread carrier in the housing which is guided therein and can be lowered for inserting the bread slices, a guide element connected to the bread carrier, which guide element operates a set of electrical contacts for switching-on heater elements, a stop in the housing on which the bread carrier in the lowered position rests, the guide element relative to the bread carrier having a free stroke sufficient to actuate the set of contacts.

Other features which are considered as characteristic for the invention are set forth in the appended claims.

Although the invention is illustrated and described herein as embodied in an electric toaster, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 1 shows diagrammatically a front view of an electric toaster in accordance with the invention; and FIG. 2 is a vertical longitudinal cross section through the electric toaster illustrated in FIG. 1, taken along line II—II of FIG. 3; FIG. 3a is a bottom view of the electric toaster shown in FIGS. 1 to 3.

DETAILED DESCRIPTION OF THE INVENTION

Figure 3:
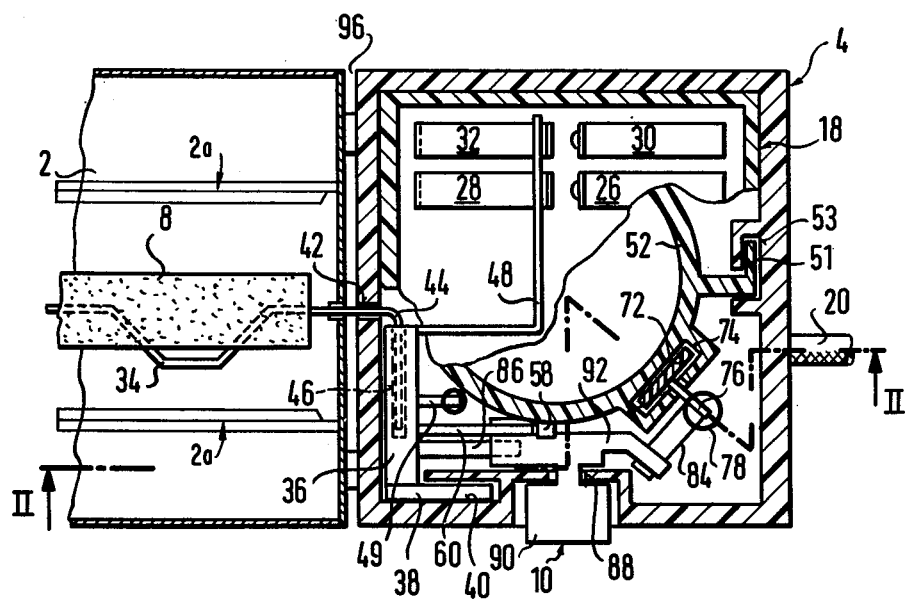
FIG. 3 is a cross section of the toaster taken along line III—III of FIG. 2.

One important feature of the invention is that the electric toaster has a pneumatic timer switch composed of a cylinder, a piston and a spring, as well as guides for the bread carrier, the piston and/or the cylinder and the wind-up element, which guides are formed into or onto the housing and/or the cylinder. The guides, at least for the piston and/or the cylinder and the bread carrier preferably extend parallel to the axis of the cylinder and are open in the removal direction of the piston or the cylinder. This construction has the advantage of eliminating guides that must be assembled separately. Also, the guides are designed so that the entire control unit of the bread toaster can be assembled by simply plugging together some parts. Further all these parts are inserted from the same direction and thus, the housing can be held in one position for assembly.

Advantageously, the housing and/or the cylinder are injection-molded parts made of known suitable plastics. Also parts with complex shapes can be produced inexpensively by this technique at the customary large quantities of such consumer products. The cylinder can be made integrally with the housing or can be welded or snapped to the housing.

The piston is connected to a piston rod, which, in its region away from the piston, is connected to a piston or cylinder guide element arranged outside the cylinder. As the guide for the entire piston assembly is arranged alongside the cylinder, the cylinder as well as this guide are open in the removal direction of the piston. The piston and cylinder device can be inserted as a simple plug-in assembly. The piston rod may have in the region where it is connected to the piston or cylinder guide element, a joint movable in all directions, making it possible for the piston to adjust itself in the cylinder. Tolerance problems are thereby avoided, as the piston which has an elastic sealing sleeve, can center itself in the cylinder. The piston rod can be made integrally with the piston guide element, of suitable elastic material, i.e. normally rigid with some "give" or flexibility, and thus, a section of reduced cross section of the piston rod can serve as the joint. With this arrangement the cylinder is fixed in the housing and the piston and an associated guide element are fixed in the housing and the piston or the cylinder are guided in their relative movement at the cylinder-piston assembly.

Advantageously, all guides are designed at a cylinder intended for fixed installation in a housing. Thereby, a compact design of all control elements is obtained as well as permitting a pre-assembly of the control unit prior to its assembly into the bread toaster housing.

In the electric toaster with a wind-up element for lowering the bread stage and cocking the timer switch, a locking device for the bread carrier may be disposed in the locked position, in the path of motion of the wind-up element and, by moving the latter against the direction of winding up, can be unlocked. For the winding-up and the unlocking, only a single, extremely simple part is therefore required. The timer switch has advantageously a take-along extension for the wind-up element and takes the latter along against the wind-up device.

The electric bread toaster has a bread carrier and a guide element connected thereto which actuates a set of electrical contacts for switching on the heater elements. In the lowered position, the bread carrier rests on a stop in the housing and the guide element has, relative to the bread carrier, a free stroke which is sufficient for actuating the set of contacts. This ensures in a simple manner the switching-off of the heater at the end of the toasting time. The bread carrier can engage the guide element by extending into an elongated hole of the guide element. The guide element is pre-tensioned by a spring against the lowering direction and has a locking element for locking it in the lowered position.

The electric toaster is provided with a connecting element for an electric power cord and the form of element is designed as the closure of a housing opening. The connecting element is preferably a substantially closed terminal box and may have a detachable cover or closing door facing toward the outside of the housing. The terminal element may further have an electric switch or set of contacts cooperating with a control element of the appliance. This promotes the subdivision of the set into subassemblies which can be produced and stocked separately.

Figure 2:
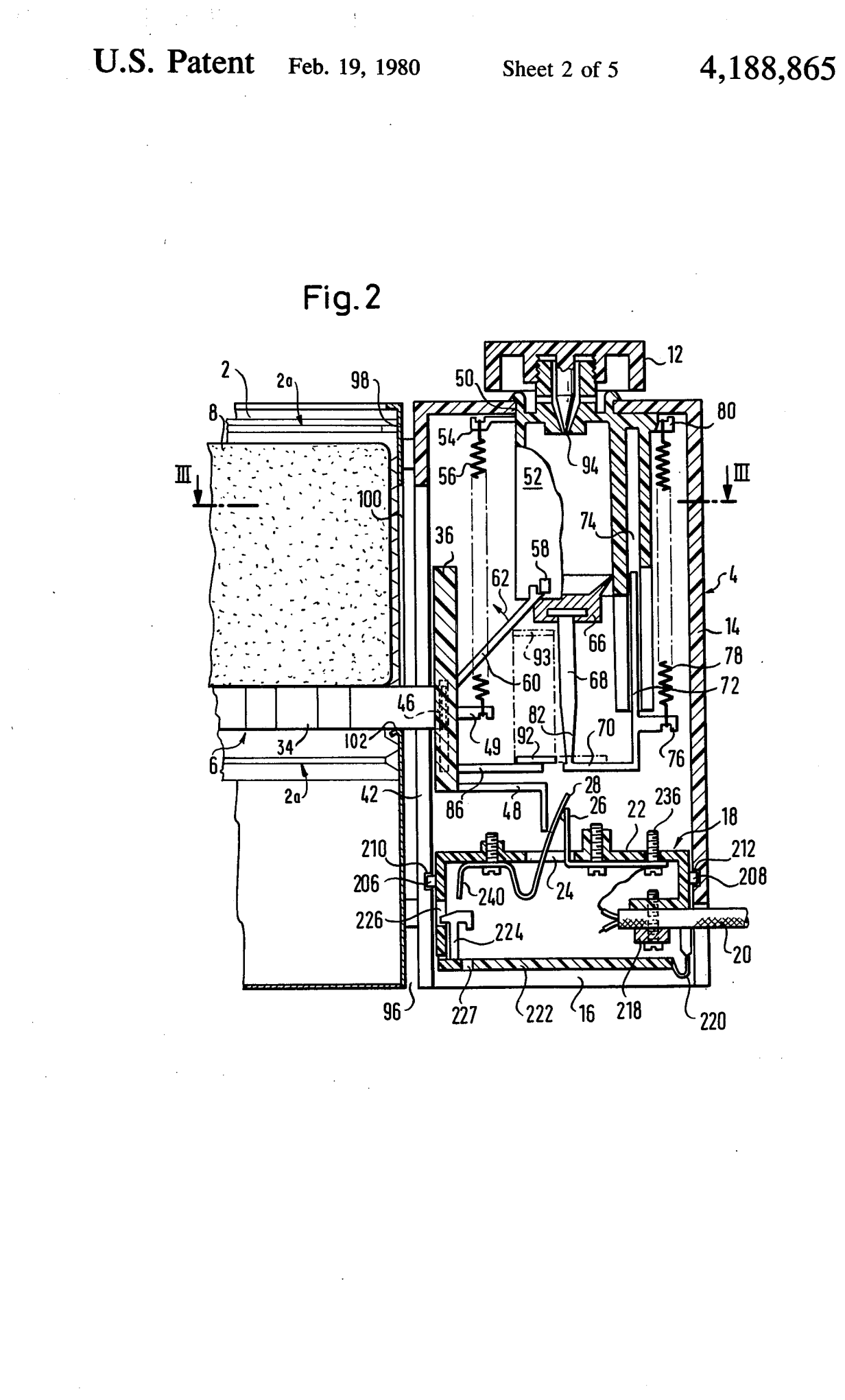

The electric toaster shown in FIGS. 1 to 3a has a toasting chamber 2 and a control unit 4 in a control chamber connected thereto at the end face. In the toasting chamber 2, two bread slices 8 can be placed on a bread carrier 6 side by side and are lowered into the toasting position by means of a wind-up element 10 arranged at the control unit, whereby at the same time a timer switch and heater elements of the toasting chamber are switched on. A control knob 12 serves for setting the toasting time and thereby, the degree of browning of the bread.

The control unit 4 has a housing 14 designed as an injection-molded plastic part, which is open at the bottom for easy removal from the mold in molding. The opening 16 on the bottom side formed thereby is closed off by a terminal box 18 for a power cord 20, which is locked therein. Reference numeral 22 in FIG. 2, designates the upper-side "top" of terminal box 18. Contact elements 26, 28, 30 and 32, which protrude through opening 24 at the top of terminal box 18, are screwed to the top and form a two-pole power switch, which in the closed condition, permit the supply of current to the heater elements conventionally made of an insulating plate with a heating coil and designated generally by 2a, of the toasting chamber 2.

The bread carrier 6 has a bread carrier proper 34 which is formed by a metal strip bent in a meander-fashion, as well as a guide element which is designed as an injection-molded plastic part and is guided, vertically movably, in a guide slot 40 formed at the housing 14, by means of a guide extension 38. One end of the bread carrier 6 protrudes through a vertical guide slot 42, which extends to the bottom and is therefore open downward in the housing 14, and engages guide element 36 with an angled-off end section 44 in an elongated hole 46 formed in the guide element 36.

A switching extension 48 is formed at the guide element 36 of the bread carrier 6, which in the fully lowered condition of the guide element, presses the contact elements 28 and 32 against the contact elements 26 and 30 and thereby switches-on the current for the heater elements.

A cylinder 52, which is open toward the bottom and is designed as an injection-molded plastic part of a pneumatic timer switch is snapped into place in a top-side opening 50 of the housing 14. For additional support of the cylinder 52, a guide bracket 51 laterally formed thereon is slid into a guide slot 53 formed on the inside of the housing 14.

The guide element 36 of the bread carrier 6 has an arm 49 for attaching a spring, onto which the return spring 56 is hooked which pre-tensions the guide element upward. The guide element 36 also has an elastic locking arm 60 which supports the guide element in its fully lowered position against an extension 58 formed at the cylinder 52. This locking arm 60 is pushed by the timer switch, in a manner to be described, in the direction of the arrow 62 at the end of the selected toasting time, thereby disengaging it from the extension 58 at the cylinder 52. The guide element 36 slides upward under the action of the return spring 56, in which process its switching extension causes the contact elements 26 to 32 to become disengaged and interrupt the current to the heater elements. A piston 66 is movably arranged in the cylinder 52 and has a piston rod 68, which is connected at its lower end to a piston guide element 72 via cross piece 70. The guide element 72 slides in a guide 74 formed at the piston 52 and has a spring attachment arm 76, from which a tension spring 78 is stretched to another spring attachment arm 80 formed at the upper end of the cylinder. The piston rod 68, the cross piece 70 and the piston guide element 72 are made integrally as an injection-molded part of an elastic material; this injection-molded part is also called in the following the piston subassembly. In order to avoid jamming of the piston 66, the piston rod has at its lower end, for the purpose of compensating for tolerances, a region 82 of reduced cross sectional area, which serves as a joint flexible in all directions.

The piston subassembly and the guide element 36 of the bread carrier 6 have take-along extensions 84 and 86, both of which cooperate with a common wind-up element 10 guided in a vertical guide slot 88 in the front wall of the housing 14. Wind-up element 10 is provided on the outside of the housing with a handle 90. As can be seen in FIG. 1, the guide slot 88 extends to the bottom of the housing 14 and is open downward.

The control knob 12 for the toasting time is a throttling element that can be screwed on the cylinder 52 and allows the air to escape from the cylinder cavity more or less rapidly by controlling the effective cross section of a throttle opening 94 of the cylinder.

In FIGS. 1 to 3, the bread toaster is shown in the fully wound-up condition and locked toasting position. As soon as the operator lets go of the wind-up element 10, the piston 66 is slowly pulled upward by the spring 78 and takes the wind-up element 10 along via the take-along extension 84. As soon as the wind-up element 10 has reached its position 93, shown in FIG. 2 by broken lines, from its previous position 92, it pushes, upon further movement, the locking arm 60 out of engagement with the extension 58 of the cylinder, so that the bread carrier springs upward under the action of the spring 56, and brings the bread to the take-out position, and disconnects the heater elements by opening the contacts 26 to 32.

In electric toasters, it is generally desired that the bread may also be taken out before the time of the timer switch is up. With the design described, it is merely necessary for this purpose to push the wind-up element 10 upward in its guide by hand, until it pushes the locking arm 60 to one side.

The control unit 4 of the electric toaster fulfills a number of functions, which requires a not inconsiderable number of functional elements. In the above-described design, the various functional elements are integrated into a small number of single-piece parts or units which can be produced as injection-molded plastic parts. These parts are designed so that they can be slid sequentially into the housing 14 of the control unit 4 in the assembly without adjustment and without tools.

Thus, after the springs 56 and 78 are hooked on, the cylinder 52 is snapped into the opening 50 of the housing 14, then the bread carrier 6 and the wind-up element 10 are pushed into their guides, whereupon the piston subassembly is inserted. Finally, the control unit 4 is closed off by snapping-in the terminal box 18. The toasting chamber 2, which has a sheet metal housing, is fastened to the control unit, leaving an air gap 96. A gap 100 for letting the bread carrier pass through is provided in the end wall 98 of the toasting chamber 2. This gap has at its lower end a stop 102, on which the bread carrier 34 rests in its lowered position. This stop also prevents the wind-up lever and the other elements from being lowered too far and prevents damage to the set of contacts. However, a stop may also be formed at the wind-up element 10, which hits in the lowest position the terminal box 18. Although all guides are open downward for easier assembly of the parts, the movement of the parts downward is limited in this manner.

Figure 4:
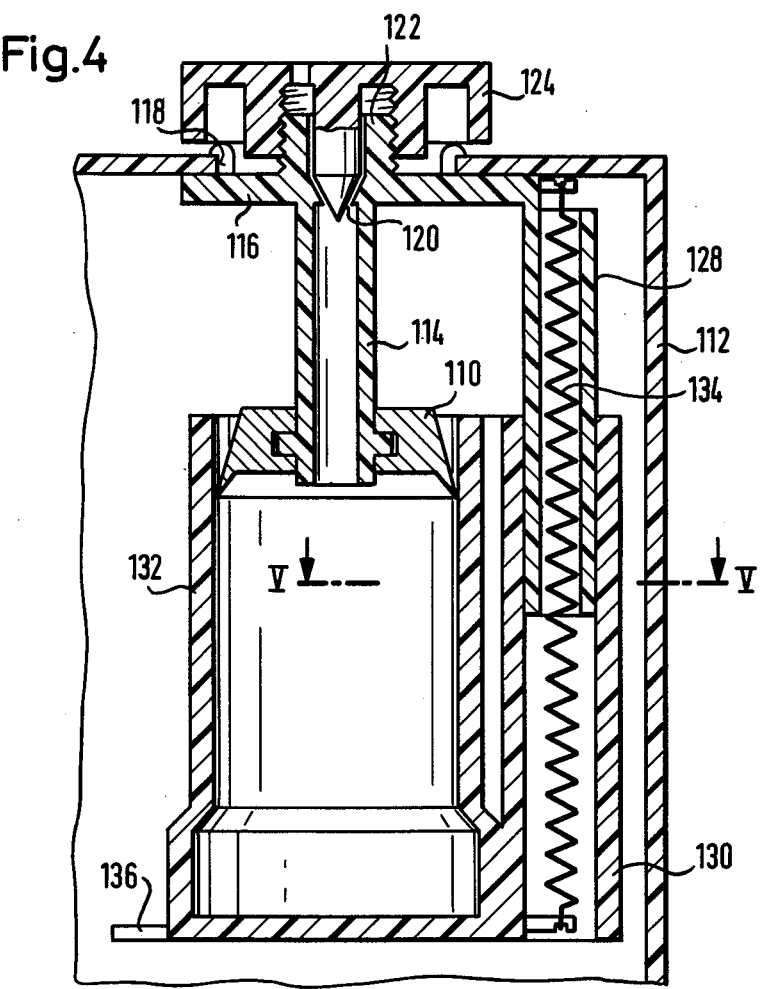
FIG. 4 is a vertical longitudinal cross section through part of a modified embodiment of a bread toaster in accordance with the invention.
Figure 5:
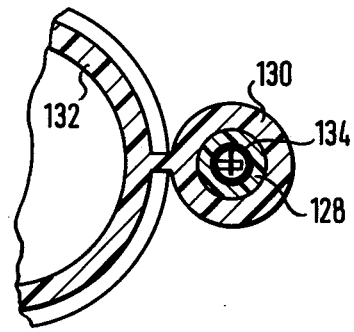
FIG. 5 is a cross sectional view taken along line V—V of FIG. 4.

In the modified embodiment of the timer switch shown in FIGS. 4 and 5, a stationary piston 110 is arranged in a housing 112 and the associated piston rod 114, which carries a piston 110 and is tubular for allowing air to be supplied to the cylinder cavity, has a base plate 116, which is snapped into an opening 118 of the housing on the top side. In the base plate, a throttle opening 120 is formed, which operates with an adjustment screw 124 for the toasting time. Adjustment screw 124 is screwed on an extension 122 of the base plate 116. At the base plate 116, a tubular guide 128, elastically flexible in all directions, is formed, which cooperates with a tubular guide extension 130, sliding over it, of a vertically movable cylinder 132. A tension spring 134 in the tubular guide elements 128 and 130 is stretched. The tension spring 134 is connected on the one side to the base plate 116 and on the other side to the lower end of the cylinder 132. The cylinder has a take-along extension 136, the function of which corresponds to that of the take-along extension 84 (FIG. 3) of the embodiment according to FIGS. 1 to 3.

Figure 6:
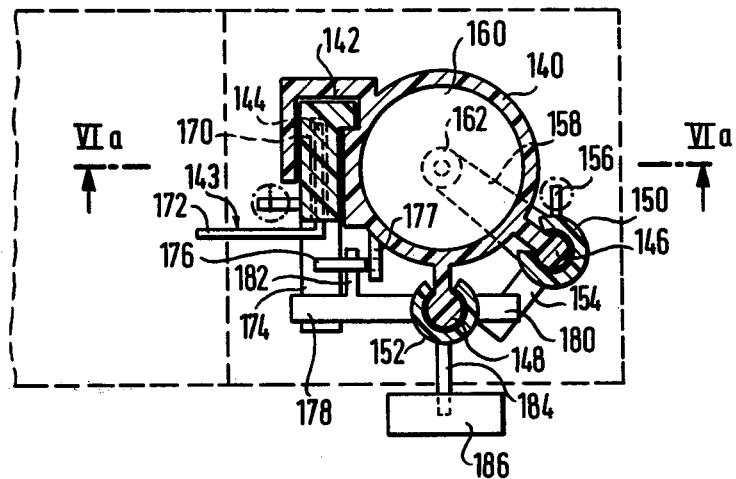
FIG. 6 is a horizontal cross sectional view similar to that of FIG. 3 through a modified embodiment of a control unit.

FIG. 6 shows a cross section through a cylinder 140 which is intended for fixed assembly in the set. At the cylinder 140 are formed a guide slot 142 for the bread carrier 143, a guide rib 146 for a cylinder guide element 150 and a guide rib 148 for a wind-up element 152.

Figure 6A:
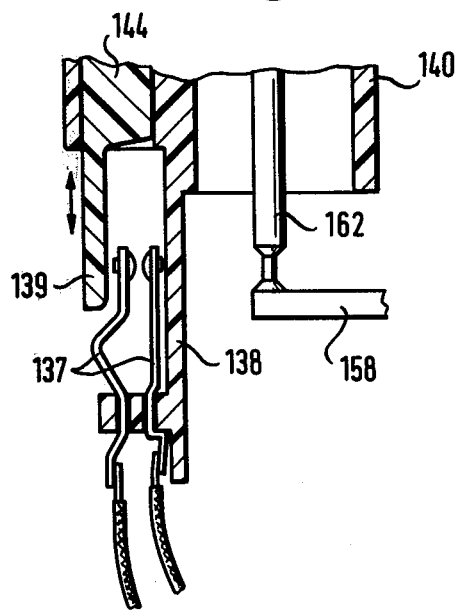
FIG. 6a is a cross sectional view taken along line VIa—VIa of FIG. 6.

The piston guide element 150 is connected via an arm 158 to the piston rod 162 carrying a piston 160 and has a lateral take-along extension 154 as well as a spring attachment arm 156. The bread carrier 143 has a guide element 144 with an elongated hole 170, into which a bread carrier 172 is placed. The guide element 144 of the bread carrier further has a take-along extension 174, from which a locking arm 176 extends at an angle upward and can be brought into engagement with a locking extension 177 formed at the cylinder. The wind-up element 152 has extensions 178, 180 and 182 which can be brought into engagement with the take-along extensions 174 and 154 of the guide element of the bread carrier and the piston guide element as well as with the locking arm 176, as well as an arm 184 for fastening a handle 186. The subassembly according to FIG. 6, which in principle works like the embodiment according to FIGS. 1 to 3, is particularly well suited for installation into housings of sheet metal and is distinguished by great compactness. Sets of contacts 137 for switching-on the toaster heating elements are mounted on an extension 138 of the cylinder 140 and are actuated by an extension 139 of the guide element 144 of the bread carrier (see FIG. 6a).

In the following, the terminal box 18 shown in FIGS. 2 to 3a as well as its function are described in further detail. The housing opening 16 is closed off by a terminal box 18, which is inserted into the former and anchored there by means of detents 206 and 208 in recesses 210 and 212 of the housing part 14, for a power line 20. The terminal box has a stress relief clamp 218 for the cord 20 as well as a bottom door 222 which is made integrally therewith and is hinged by means of film hinge 220. A springy detent hook 224 formed at the bottom door 222 engages with a lateral opening 226 of the terminal box and can be moved from the locked position by means of a tool that can be inserted through an opening 227 in the door 222. The contact element 26 has a terminal screw 236 shown in FIG. 2 for one pole of the power line cord 20. The contact element 28 has a soldering lug 240 for a lead, not shown, to the heater, likewise not shown, of the electric toaster. For the second pole of the power line cord, a pair of contact elements 30 and 32, similar to the pair of contact elements 26 and 28, are provided.

Deviating from the embodiment example shown, a terminal dish may be provided instead of the terminal box 18, in which all connection elements and the sets of contacts are fastened to the bottom or the side walls.

These are claimed:

1. In an electric toaster comprising a housing, a toasting chamber in said housing, an opening in the top of said housing for insertion of bread in said toasting chamber, a bread carrier movable down and up in said toasting chamber, heating elements in said toasting chamber for toasting the bread when said bread is moved down on said bread carrier in said toasting chamber, the combination therewith of a control chamber adjacent said toasting chamber, a pneumatic timer switch in said control chamber having a cylinder and piston movable relative to one another and a spring urging upward movement of said cylinder and piston relative to one another, and a throttle opening through which fluid escapes from the cylinder during said upward movement to retard said upward spring urging, wind-up means for lowering said bread carrier and cocking said pneumatic timer switch extending through said control chamber engaging said bread carrier and the movable portion of said cylinder and piston, said wind-up means including a guide element which operates a set of electrical contacts for switching-on heater elements, a stop in said housing on which said bread carrier in the lowered position rests, said guide element relative to said bread carrier having a free stroke sufficient to actuate said set of contacts, and guide means for guiding said moement of said bread carrier and said movement of said wind-up element and said relative movement of said cylinder and piston.

2. An electric toaster according to claim 1, wherein at least one of said guide means are integral with said control chamber.

3. An electric toaster according to claim 1, wherein at least one of said guide means are integral with said cylinder.

4. An electric toaster according to claim 1, wherein said cylinder is stationary and said piston is movable.

5. Electric toaster according to claim 4, wherein sets of contacts for switching-on said toaster heating elements are fastened to an extension of the cylinder.

6. An electric toaster according to claim 1, wherein said piston is stationary and said cylinder is movable.

7. An electric toaster according to claim 1, wherein said guide means for guiding said movement of said bread carrier and said relative movement of said cylinder and piston extend parallel to the axis of said cylinder.

8. An electric toaster according to claim 7, wherein said control chamber has an opening for insertion of said cylinder.

9. An electric toaster according to claim 7, wherein said control chamber has an opening for insertion of said piston.

10. An electric toaster according to claim 9, wherein said cylinder is open in the direction of removal of said piston through said opening in said control chamber.

11. Electric toaster according to claim 7, wherein said spring urging upward movement of said piston and cylinder relative to one another, is arranged in said guide means for guiding said relative movement of said piston and cylinder.

12. An electric toaster according to claim 1, wherein said control chamber is made of plastic.

13. Electric toaster according to claim 1, wherein said cylinder is made of one piece with said control chamber.

14. Electric toaster according to claim 1, wherein said cylinder is welded to said control chamber.

15. Electric toaster according to claim 1, wherein said cylinder is snapped into said control chamber.

16. Electric toaster according to claim 1, wherein said piston is connected to a piston rod which is connected, in a region away from the piston, to a guide element disposed outside the cylinder.

17. Electric toaster according to claim 1, wherein said piston is connected to said control chamber in fixed relationship and said cylinder is guided movably relative to said piston.

18. Electric toaster according to claim 17, wherein said piston has a tubular, hollow piston rod which communicates with the cylinder cavity and through which hollow piston rod, air may flow from the cylinder cavity.

19. In an electric toaster comprising a housing, a toasting chamber in said housing, an opening in the top of said housing for insertion of bread in said toasting chamber, a bread carrier movable down and up in said toasting chamber, heating elements in said toasting chamber for toasting the bread when said bread is moved down on said bread carrier in said toasting chamber, the combination therewith of a control chamber adjacent said toasting chamber, a pneumatic timer switch in said control chamber having a cylinder and piston movable relative to one another and a spring urging upward movement of said cylinder an piston relative to one another, and a throttle opening through which fluid escapes from the cylinder during said upward movement to retard said upward spring urging, a wind-up element for lowering said bread carrier and cocking said pneumatic timer switch extending through said control chamber engaging said bread carrier and the movable portion of said cylinder and piston, and guide means for guiding said movement of said bread carrier and said movement of said wind-up element and said relative movement of said cylinder and piston, wherein said piston is connected to a piston rod which is connected, in a region away from the piston, to a guide element disposed outside the cylinder, and wherein said piston rod has in the region of its connection to said guide element a joint flexible in all directions.

20. An electric toaster according to claim 19, wherein said cylinder is made of plastic and wherein said guide element disposed outside the cylinder moves in a guide attached to the outside of the cylinder.

21. Electric toaster according to claim 19, wherein said piston rod is made integrally with said guide element of an elastic material and that said piston rod has a region or reduced cross section serving as said flexible joint.

22. An electric toaster comprising a housing, an opening in the top of said housing for insertion of bread, a bread carrier movable down and up in said housing, a spring urging the bread carrier upwardly, lock means for holding the bread carrier in down position against the urging of said spring, heating elements for toasting the bread when said bread is moved down on said bread carrier in locked position, a pneumatic timer switch having a cylinder and piston movable relative to one another and a spring urging upward movement of said cylinder and piston relative to one another, and a throttle opening through which fluid escapes from the cylinder during said upward movement, wind-up means for lowering said bread carrier and cocking said pneumatic timer switch engaging said bread carrier and the movable portion of said cylinder and piston, said wind-up means including a guide element connected to the bread carrier, which guide carrier operates a set of electrical contacts for switching-on heater elements, said guide element relative to said bread carrier having a free stroke sufficient to actuate said set of contacts, said lock means for holding the bread carrier in down position disposed in the locked position in the path of motion of said wind-up element and is unlocked by moving the wind-up element against the wind-up direction.

23. Electric toaster according to claim 22, wherein said time switch has a take-along extension which engages said wind-up element and takes the latter along against the wind-up direction.

24. An electric toaster having a housing, a bread carrier in the housing which is guided therein and can be lowered for inserting the bread slices, a guide element connected to the bread carrier, which guide element operates a set of electrical contacts for switching-on heater elements, a stop in said housing on which said bread carrier in the lowered position rests, said guide element relative to said bread carrier having a free stroke sufficient to actuate said set of contacts.

25. Electric toaster according to claim 24, wherein said bread carrier extends into an elongated hole of said guide element engaging said guide element.

26. Electric toaster according to claim 24, wherein said guide element is connected to a spring urging the guide element in an upward direction and wherein said guide element has a locking element for locking the guide element in the lowered position.

27. Electric toaster according to claim 24, wherein said bread carrier extends into an elongated hole of said guide element engaging said guide element.

28. Electric toaster according to claim 27, wherein said guide element is connected to a spring urging the guide element in an upward direction and wherein said guide element has a locking element for locking the guide element in the lowered position.

* * * * *